United States Patent [19]

Oftedahl

[11] 4,030,227

[45] June 21, 1977

[54] BAIT BUCKET

[76] Inventor: Everett J. Oftedahl, 505 Highway 173, Antioch, Ill. 60002

[22] Filed: May 28, 1976

[21] Appl. No.: 690,919

[52] U.S. Cl. .......................................... 43/56; 43/55
[51] Int. Cl.² ....................................... A01K 97/04
[58] Field of Search ............... 43/55, 56, 4, 54.5;
 220/23, 212, 352, 354; 222/189, 192, 356;
 215/227, 228, 231; 294/1 R, 55; 209/418;
 206/804

[56] References Cited

UNITED STATES PATENTS

| 657,508 | 9/1900 | Brown | 209/418 |
|---|---|---|---|
| 2,899,103 | 8/1959 | Ebert | 43/55 |
| 3,039,225 | 6/1962 | Semelka | 43/56 |
| 3,319,372 | 5/1967 | Wright | 43/56 |
| 3,550,307 | 12/1970 | Donner | 43/56 |
| 3,886,679 | 6/1975 | Marcell | 43/56 |

Primary Examiner—Russell R. Kinsey
Assistant Examiner—Peter K. Skiff
Attorney, Agent, or Firm—Fitch, Even, Tabin & Luedeka

[57] ABSTRACT

A bait bucket is disclosed having a receptacle for holding live bait and having a combination lid and bait scoop. The lid includes an end portion which projects downwardly into the receptacle when the lid is covering the receptacle and which serves as a bait scoop when the lid is removed from and inserted into the receptacle.

4 Claims, 3 Drawing Figures

U.S. Patent June 21, 1977 4,030,227
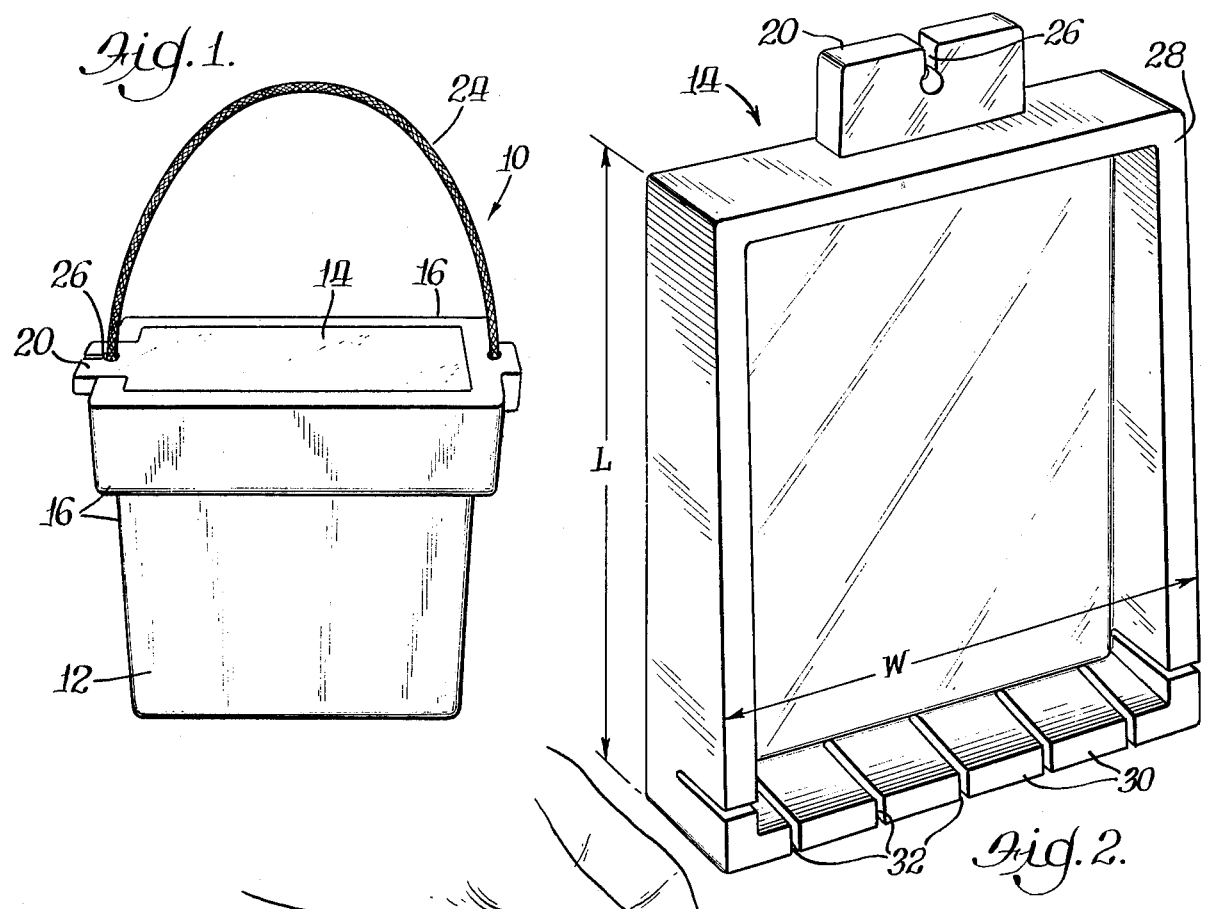
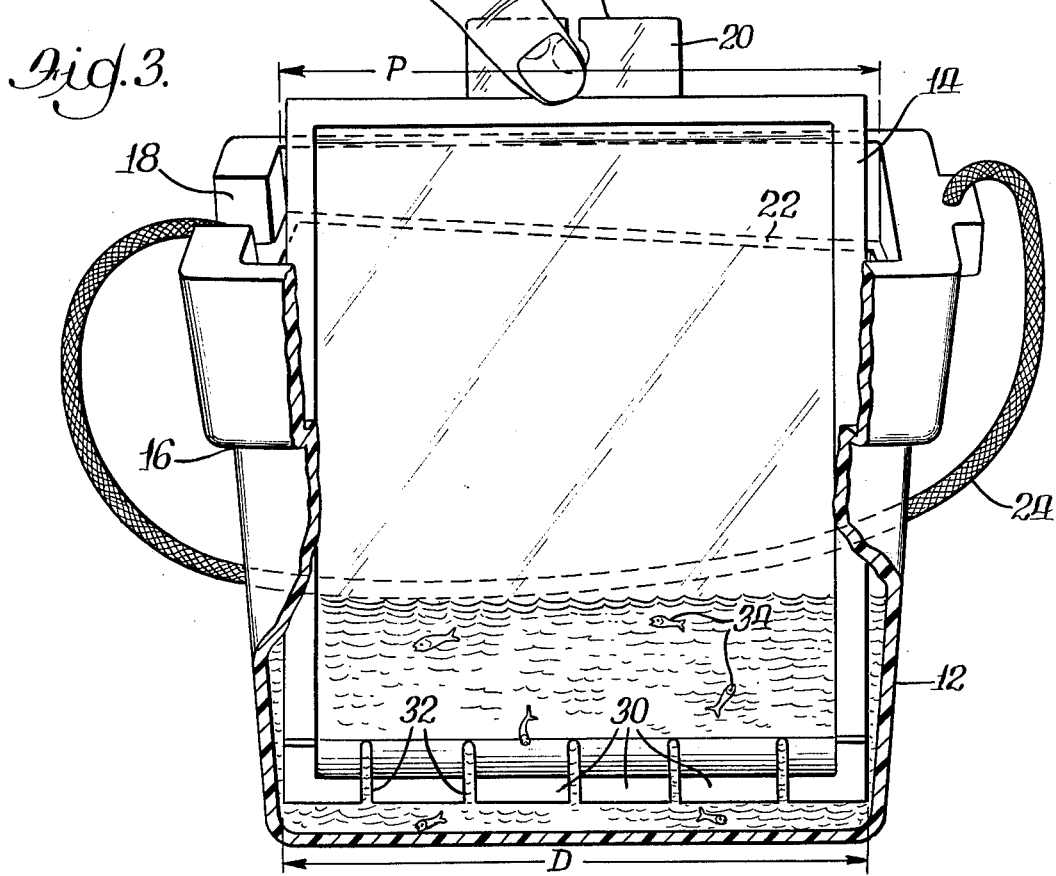

BAIT BUCKET

This invention relates to fishing bait containers and particularly to containers for live bait.

Containers for live bait such as minnow buckets generally provide a receptacle for the bait and water, and have lids for the receptacles. Some such buckets also include means by which one removes the bait from the receptacle without inserting one's hands into the water. Conventional minnow buckets which provide such means for removing the bait typically include a removable mesh basket within the bucket or a screen at the bottom of the bucket which can be lifted upwardly to scoop up the bait within the bucket.

A disadvantage of including either a mesh basket or screen within the bait bucket to retrieve the bait is that the total bait bucket then includes three pieces i.e., the bait receptacle, the lid, and the basket, and the bucket is therefore necessarily more expensive than two-piece buckets which include only the bait receptacle and a lid. Moreover, in the conventional three-piece bait bucket, all the bait is scooped to the surface at once even though only one piece of bait may be desired. All the bait thus becomes subject to injury each time a single piece of bait is needed.

Accordingly, it is a general object of this invention to provide an improved bait bucket for live bait.

It is a more specific object of the invention to provide a bait bucket having the cost advantages of a two-piece bucket while including provision for scooping selected bait from the bucket.

These and other objects of the invention are more particularly set forth in the following detailed description and in the accompanying drawings of which:

FIG. 1 is a perspective view of a bait bucket embodying various aspects of this invention;

FIG. 2 is a perspective view of a combination lid and bait scoop for the bait bucket shown in FIG. 1; and FIG. 3 is a perspective view of the bait bucket shown in FIG. 1 with the bait bucket partly broken away to illustrate the operation of the bait scoop.

Broadly stated, this invention is directed to a bait bucket having a receptacle for bait and having a lid which serves both as a cover for the receptacle and as a scoop for the bait.

In an embodiment described herein, the lid has a flanged end portion which projects downwardly into the receptacle when the lid is covering the receptacle and which serves as a bait scoop when the lid is removed and inserted into the receptacle. Openings in the flanged scoop allow water to drain out of the scoop while retaining the bait.

Referring now to FIG. 1, there is shown a bait bucket 10 embodying the above-described features. The bucket 10 includes a unitary, molded foam (expanded polystyrene) bait receptacle 12 and a mating molded foam lid 14. The lid 14 serves both as a cover for the receptacle 12 and as a bait scoop for scooping bait from within the receptacle, as described in more detail below.

The receptacle 12 has four sidewalls 16 with a slot 18 in one of the sidewalls 16 (shown more clearly in FIG. 3) for receiving a handle 20 which projects from the lid 14. An inner ledge 22 extends substantially around the inner perimeter of the receptacle 12 for supporting the lid 14 when the bait bucket 10 is closed. The ledge 22 is so positioned with respect to the top of the receptacle 12 that, when the lid 14 is resting on the ledge 22 as in FIG. 1, the top of the lid 14 is substantially flush with the top of the receptacle 12. The length and width of the lid 14 are slightly smaller than the corresponding inner dimensions of the receptacle 12, whereby the sides of the lid 14 are substantially enclosed by the side walls 16 of the receptacle 12, thereby providing a snug fit between the lid 14 and the receptacle 12 to ensure that the bait is well insulated and to assist in holding the lid in place.

The lid 14 is easily removed from the receptacle 12 by means of the handle 20 which projects from and is integrally molded with the lid 14. A carrying strap 24, made of nylon for example, is fastened to opposite ends of the receptacle 12 and passes through an opening 26 in the handle 20, the strap 24 thereby assisting in holding the lid 14 in place.

The features of the lid 14 which make it useful as a bait scoop are shown in FIGS. 2 and 3. Referring first to FIG. 2, the lid 14 has an integrally molded flange 28 extending around the lid 14. At one end of the lid 14 the flange 28 is slotted to provide a bait scoop by forming a set of scoop fingers 30 for scooping bait from within the receptacle 12, as shown in FIG. 3. The slotted openings 32 between the fingers 30 serve to drain water out of the scoop while retaining the bait. When the lid 14 is to be used as a bait scoop, the handle 20 is disengaged from the strap 24 and the scoop end of the lid 14 is inserted into the receptacle to retrieve the bait 34 as shown in FIG. 3. As the lid 14 and the bait are removed from the receptacle 12, water drains out of the scoop through openings 22. One or more pieces of bait can be thus removed from the receptacle 12 without risking injury to the other bait. If it is desirable to remove all the bait simultaneously, the scoop can be inserted to the bottom of the receptacle 12 and, with a scooping motion, each piece of bait can be gathered. This ability of the lid 14 to gather all the bait at once, if desired, is made possible in the illustrated embodiment by dimensioning the lid 14 and the receptacle 12 so that the width W (FIG. 2) of the lid 14 is only slightly less than the corresponding inner bottom dimension D (FIG. 3) of the receptacle 12. Thus, no bait can escape around the edges of the scoop when it is inserted all the way into the receptacle 12.

In order to permit the lid 14 to be easily inserted into the receptacle 12, the sidewalls 16 are tapered as shown in FIGS. 1 and 3 so that, near the top of the receptacle 12, the width of the lid 14 is substantially less than the corresponding inner dimension P (FIG. 3) of the receptacle 12. This tapering of the sidewalls 16 thus provides an adequate opening for the insertion of the scoop and ensures that, at the bottom of the receptacle, the scoop will extend substantially from one sidewall to the opposite sidewall so that no bait can elude the scoop. Such tapering also makes it easier to remove the molded receptacle 12 from its mold form during fabrication.

The length L (FIG. 2) of the lid 14 is made somewhat greater than the depth of the receptacle 12 so that, when the scoop end of the lid 14 is inserted to the bottom of the receptacle 12, the handle 20 of the lid 14 extends above the top of the receptacle 12 so that one's hands need never be inserted into the water in the receptacle 12.

When the lid 14 is replaced on the receptacle 12, the flange 28 extends downwardly into the receptacle 12 and rests on the ledge 22, the handle 20 engages the slot 18, and the carrying strap 24 is inserted into the opening 26 in the handle 20, thereby substantially locking the lid 14 in place.

Although the lid-scoop combination 14 has been shown as preferably including a flange 28 which extends completely around the lid 14 and which is slotted at one end to form the bait scoop, many variations in the illustrated structure are possible. For example, the slots 32 may be replaced by circular openings and the flange 28 need not extend completely around the lid 14. To form the scoop, only one end portion of the lid 14 need include a downwardly projecting member such as a flange. However, extending the flange 28 completely around the lid 14 adds strength to the lid 14 and, in combination with the ledge 22 in the receptacle 12, provides a convenient method of supporting the lid 14 within the receptacle 12.

The bait bucket described above provides, in accordance with the objectives of this invention, an inexpensive, two-piece bait bucket with provisions for scooping selected bait from within the bucket. In addition, the illustrated embodiment is a light weight, well insulated, bait bucket whose lid-scoop combination is conveniently locked in place by virtue of its engagement with the carrying strap and the way in which the lid and its projecting handle mate with the bait receptacle.

In addition to the variations described above, it is evident that many other modifications and variations in the illustrated bait bucket will be apparent to those skilled in the art in light of this disclosure. Accordingly, it is intended to embrace all such modifications and variations which fall within the spirit and scope of this invention as defined by the appended claims.

What is claimed is:

1. A bait bucket, comprising: a bait receptacle having an open top; and a removable, combination lid and scoop for covering the receptacle and for scooping live bait from within the receptacle, said receptacle including four sidewalls and a ledge on said sidewalls extending substantially around the inner perimeter of the receptacle for supporting the lid when the bait bucket is closed, said ledge being so positioned with respect to the top of the receptacle that, when the lid is resting on the ledge, the top of the lid is substantially flush with the top of the receptacle, said lid having at least one end portion which projects substantially downwardly into the receptacle when the lid is covering the receptacle and which serves as a bait scoop when the lid is removed from and inserted into the receptacle and said lid including an integral handle projecting from a second end portion of the lid and said receptacle including a slot in one of its walls for receiving said handle.

2. A bait bucket as set forth in claim 1, wherein the handle projecting from the lid has an opening therein and a carrying strap is fastened to said receptacle and passes through the opening in the handle for assisting in locking the lid in place on the receptacle.

3. A bait bucket as set forth in claim 1 wherein the length of the lid is greater than the depth of the receptacle so that, when the scoop end of the lid is inserted to the bottom of the receptacle, the lid handle extends above the top of the receptacle.

4. A bait bucket, comprising:
   a molded bait receptacle having an open top, four sidewalls with a ledge extending around the inner perimeter of the receptacle, and a slot in the top of one of the sidewalls;
   a molded, combination lid and scoop for covering the receptacle and for scooping live bait from within the receptacle, said lid having a flange extending substantially around the lid for resting on the receptacle ledge when the lid is covering the receptacle and for forming, at an end portion of the lid, a bait scoop for scooping bait from within the receptacle, said flange having a plurality of openings therein at the scoop end of the lid for draining water out of the scoop while retaining the bait; and
   a lid handle integrally molded with and projecting from an end portion of the lid for mating with the slot in the receptacle when the lid is covering the receptacle.

* * * * *